United States Patent [19]
Jang et al.

[11] Patent Number: 5,862,249
[45] Date of Patent: Jan. 19, 1999

[54] AUTOMATED METHOD AND SYSTEM FOR DETERMINATION OF POSITIONAL ORIENTATION OF DIGITAL RADIOGRAPHIC IMAGES

[75] Inventors: Ben Kwei Jang, Rochester; Roger Stephen Gaborski, Pittsford, both of N.Y.

[73] Assignee: Eastman Kodak Company, Rochester, N.Y.

[21] Appl. No.: 567,019

[22] Filed: Dec. 1, 1995

[51] Int. Cl.⁶ .................................................. G06K 9/32
[52] U.S. Cl. ...................... 382/132; 382/288; 382/289; 382/295
[58] Field of Search .................................. 382/289, 288, 382/132, 295, 131, 192, 195; 378/4, 901; 128/922

[56] References Cited

U.S. PATENT DOCUMENTS

| | | | |
|---|---|---|---|
| 4,851,701 | 7/1989 | Nakajima | 250/587 |
| 4,870,694 | 9/1989 | Takeo | 382/189 |
| 4,958,939 | 9/1990 | Samad | 382/295 |
| 5,268,967 | 12/1993 | Jang et al. | 382/132 |
| 5,506,918 | 4/1996 | Ishitani | 382/289 |
| 5,533,143 | 7/1996 | Takeo | 382/132 |
| 5,623,560 | 4/1997 | Nakajima et al. | 382/295 |

*Primary Examiner*—Yon Couso
*Assistant Examiner*—Jon Chang
*Attorney, Agent, or Firm*—William F. Noval

[57] ABSTRACT

An automated method and system for determining the positional orientation of radiographic images, wherein digital image data is acquired and subjected to multiple phases of digital imaging processing. The image is processed to segment the object of interest, i.e., a body region, from the foreground and background of the image. Next, the center is determined for the body region. The body region center is then positioned so that it coincides with the center of the film or medium. The image is subsequently decomposed into one or more horizontal and vertical strips. Feature extraction is performed on these strips to preliminarily determine the orientation of the image. Finally, a set of rules is applied to the image information described above to determine the positional orientation of the image.

10 Claims, 5 Drawing Sheets

AUTOMATED METHOD AND SYSTEM FOR DETERMINATION OF POSITIONAL ORIENTATION OF DIGITAL RADIOGRAPHIC IMAGES

TECHNICAL FIELD

The present invention relates to an automated method and system for digital image processing of radiographic images, and more specifically, to an automated method and system for determining the positional orientation of a digital radiographic image.

BACKGROUND OF THE INVENTION

Radiographic images of anatomical regions are a routine and valuable diagnostic and research tool. Such images are typically produced by placing an object, such as a portion of the human body, on a plate having a surface composed of excitable phosphors (a film) and exposing the object and film to radiation such as X-rays, $\alpha$-rays, $\beta$-rays, $\gamma$-rays, ultraviolet rays, or the like. As the radiation energy strikes the surface of the film, a portion of the energy is stored by the phosphor-containing film. Upon subsequent stimulation by visible light or other stimuli, the film gives off light in direct proportion to the amount of energy stored therein. Areas of the film receiving unattenuated radiation absorb the most energy and thus produce the most light when subsequently stimulated. Areas in which lesser amounts of radiation energy are absorbed, due to the presence of the object (e.g., body region), produce a proportionately lesser amount light when subsequently stimulated.

The image is displayed for viewing in one of several ways. For example, the stored energy of the film can be photoelectrically detected and converted into a signal which is then further processed or used to reproduce the image on a photographic film, CRT or similar device.

One of the most common radiographic images utilized in clinical settings today is an image of the thoracic area of human body (e.g., chest x-ray). Such images provide invaluable information and are used to diagnose maladies ranging from lung and breast cancer to emphysema.

A radiographic image of an anatomical region like a chest x-ray contains three main regions: (1) the foreground; (2) the background; and (3) the anatomical region of interest. For purposes of this Application, the term "background" is used to denote the very high intensity regions of a film, wherein unattenuated radiation energy was absorbed by the film (i.e., the area in which no body portion or object was present). "Foreground" will be used herein to designate the very low intensity regions of the film, wherein highly absorbent structures (e.g., collimator blades) are used to "frame" the field of irradiation on the film. The anatomical region of interest for purposes of illustration only will be the chest and thoracic area of the human body.

The quality of information obtainable from a digital radiographic image, such as a chest film, depends on several factors, including the device used to acquire the original image, any image enhancements and/or analysis performed on the original image, the capabilities of the output device, and the positional orientation of the anatomical region of interest within the image.

The positional orientation of the anatomical region of interest with respect to the film is of perhaps obvious critical importance to the image interpreter (e.g., radiologist), as well as for further processing of the image.

Today most radiologists interpret films from light boxes. When the films are brought to the light boxes and placed by technicians, secretaries, or other personnel, the films are expected to have a correct orientation to facilitate proper reading. Correct orientation takes on increased importance where radiologists compare the newly acquired film with one or more previous films of the anatomical region of interest.

Additionally, proper positional orientation of an image is necessary for automated image enhancing and reading systems, which often assume an arbitrary positional orientation for any given image signal. For example, where an image will be viewed on a CRT or similar device the positional orientation is assumed to be parallel with the longitudinal direction of the rectangular phosphor surface on which the image was created (i.e., the neck portion of the image is aligned with the "top" of the film). Accordingly, feeding an image signal oriented in any position other than parallel with the longitudinal direction of the phosphor surface produces errors in the display and prevents accurate further enhancement and/or processing of the image.

Due to the importance of this information, prior art attempts at detecting positional orientation of a radiographic image are known. For example, one prior art method compares the sum of intensity values of the image signal of a horizontal strip of the subject film with the sum of the intensity values of the image signal of a vertical strip of the subject film. The strips are taken from the subject film without differentiating the source of the intensity values within the strip (i.e., there is no way to tell if the intensity values are from the body region of interest, the background or the foreground). Accordingly, if a portion of the foreground (very low intensity values) or background (very high intensity values) of the film is included in the strip, the calculations of distribution are skewed in one or both directions. In such instances, the ultimate determination of orientation lacks consistency and thus reliability.

Another prior art method utilizes a comparison of the characteristic values (sum of the intensity values and the average intensity value) for a horizontal strip of the film and for a vertical strip of the film. Although this method purportedly ensures that the strips will pass through the central portion of the image, this method also lacks any differentiation of the source of the image values used in the calculations. Thus, it is also impossible with this prior art method to determine whether, and by how much, the results are skewed by the inclusion of a portion of the background and/or foreground of the film. An additional problem associated with this prior art method is that the method assumes perfect alignment of the body region of interest on the film to ensure that the strips are taken through the central portion of the image. This assumption ignores the reality of actual image production.

A different prior art method attempts to determine whether a digital chest radiographic image has line symmetry or not, based on the thoracic vertebrae extending vertically in the image signal. Although this method also may be used to detect the orientation of a digital chest radiographic image, the problem of lack of differentiation of body region of interest versus foreground and background intensity values also exists in this method. Additionally, once again, the method makes the unrealistic assumption that the body region of interest is perfectly centered in the image signal.

It is observed that methods without distinguishing between the desired regions of the image (the body region of interest) and the undesired regions of the image (the foreground and background) are suboptimal, producing inconsistent and unreliable results.

Thus a need remains for an automated method and system for digital image processing of radiographic images to determine positional orientation wherein the undesired portions of the image (the foreground and background) are distinguished from the desired portion (the body region(s) of interest) and are excluded from the analysis.

SUMMARY OF THE INVENTION

The automated method and system for determining the positional orientation of a digital radiographic image of the present invention overcomes the foregoing and other problems associated with the prior art by identifying the desired and undesired portions of the image of interest and determining the positional orientation of the image without reference to the undesired portion.

First, an image signal is acquired of the anatomical region of interest. Once the image signal is acquired, the signal is subjected to digital image processing to initially identify the desired portion (anatomical region of interest) and undesired portion (image background and foreground). Next, the exact center of the anatomical region of interest is determined. Once the true center of the anatomical region of interest is known, the anatomical region of interest is shifted, if necessary, so that the center of the anatomical region of interest coincides with the center of the input image signal. Correct alignment of the anatomical region of interest with the center of the image signal is important to further steps of detection and processing. Determining the actual center of the image, and making corrections, if necessary, to align the image with the film avoids a portion of the inconsistency and unreliability of the prior art methods previously discussed.

The anatomical region of interest is subsequently decomposed into one or more horizontal strips and one or more vertical strips. The horizontal and vertical strips are designed in such a way so that no horizontal strip overlaps with any other horizontal strip, and, likewise, no vertical strip overlaps with any other vertical strip.

The next step of the method of the present invention includes extracting certain density and intensity features from the horizontal and vertical strips derived in the previous step. These features are used to develop a set of rules which can effectively determine the positional orientation of the image.

The final step of the method of the present invention is utilizing the rules developed in the previous step to determine the positional orientation of the image.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE DRAWINGS

Figure 1:
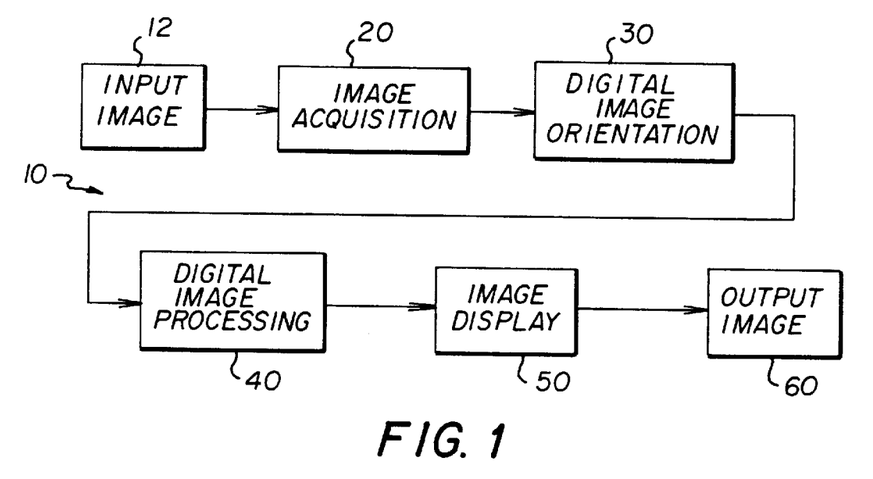
FIG. 1 is a block diagram of an imaging system including the automated system and method of the present invention.

Referring to FIG. 1, there is shown a block diagram of an imaging system including the automated method and system of the present invention. The imaging system 10 comprises an image acquisition device 20, the digital image orientation processor 30, a digital image signal processor 40, and an image display 50. Although the digital image orientation processor 30 of the present invention is illustrated as a separate system, it can reside within the image acquisition device 20 or within the image signal processor 40. Moreover, if the result from the digital image orientation processor 30 is not required for further image processing, the image orientation processor 30 can be also inserted between the image processor 40 and the image display system 50.

The digital image signals to be processed utilizing the above-described system can be acquired in a variety of ways. For example, such images are typically derived from storage phosphor (computed radiography) systems, film digitizer systems, image intensifier systems, and the like. Additionally, images acquired via computed tomography (CT) and magnetic resonance imaging (MRI) systems can be utilized. The type of image processor 40 utilized in the image system 10 will be dependent upon the type of digital image being processed and the ultimate use of the results of said processing. Finally, any number of display devices can be used with the image system 10. For example, the most common display devices are film writers (either laser printers or cathode ray tube (CRT) printers) and CRT soft displays. Additionally, the output image 60 can be captured for permanency on photographic film.

Figure 2A:
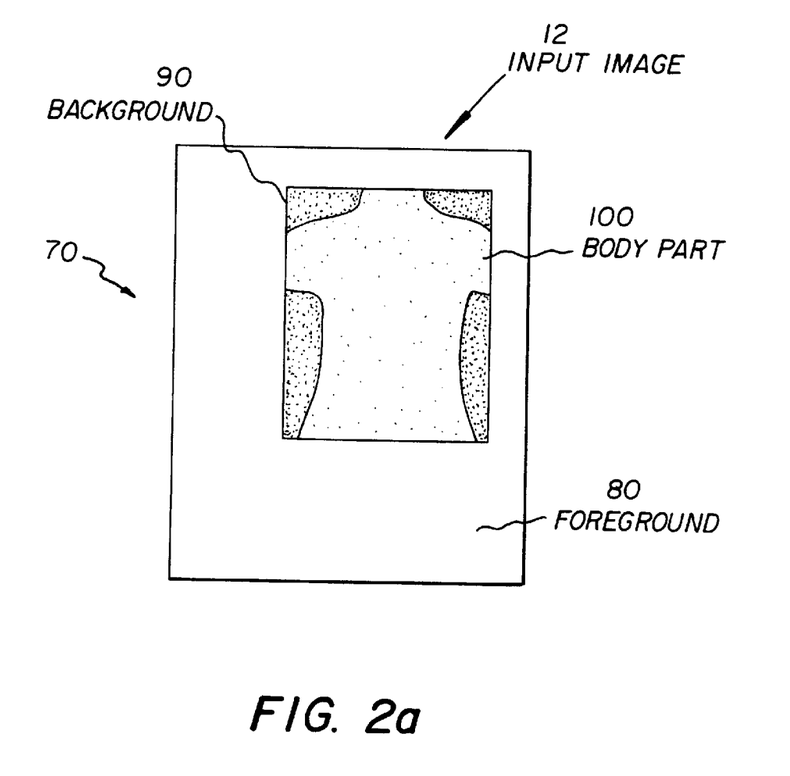
FIG. 2(a) illustrates a digital radiographic image containing foreground, background, and a body region.
Figure 2B:
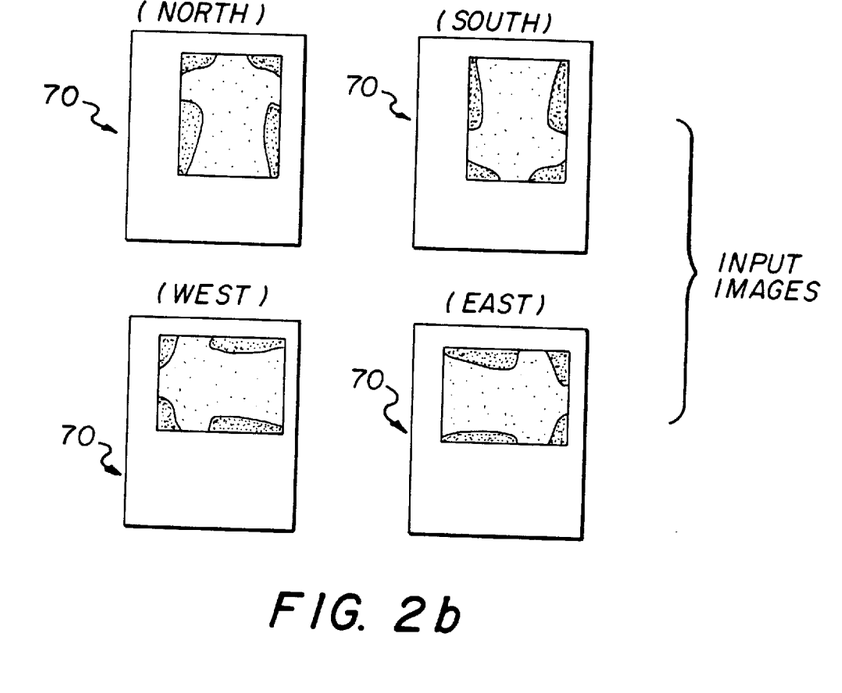
FIG. 2(b) is a schematic diagram illustrating the four possible orientations (North, South, East and West) of an input digital radiographic image with the orientation indicated by the approximate direction of the neck.

FIG. 2(a) shows a digital radiographic image 70 containing a foreground 80, background 90, and body region of interest 100. The body region of interest 100, for illustration purposes only, is the thoracic region of the human body. FIG. 2(b) illustrates the four possible orientations of a digital radiographic image 70 recorded in a 90 rotated direction, where the orientation is referenced by the approximate direction of the neck portion of the body in the image signal. Accordingly, for purposes of this Application, where the neck portion is directed towards the top of the image, the image is said to be "NORTH". Where the neck portion is directed towards the bottom of the image, the image is said to be "SOUTH". Likewise, where the neck portion of the image is directed to the right or left, the image is said to be "EAST" or "WEST", respectively.

Figure 3:
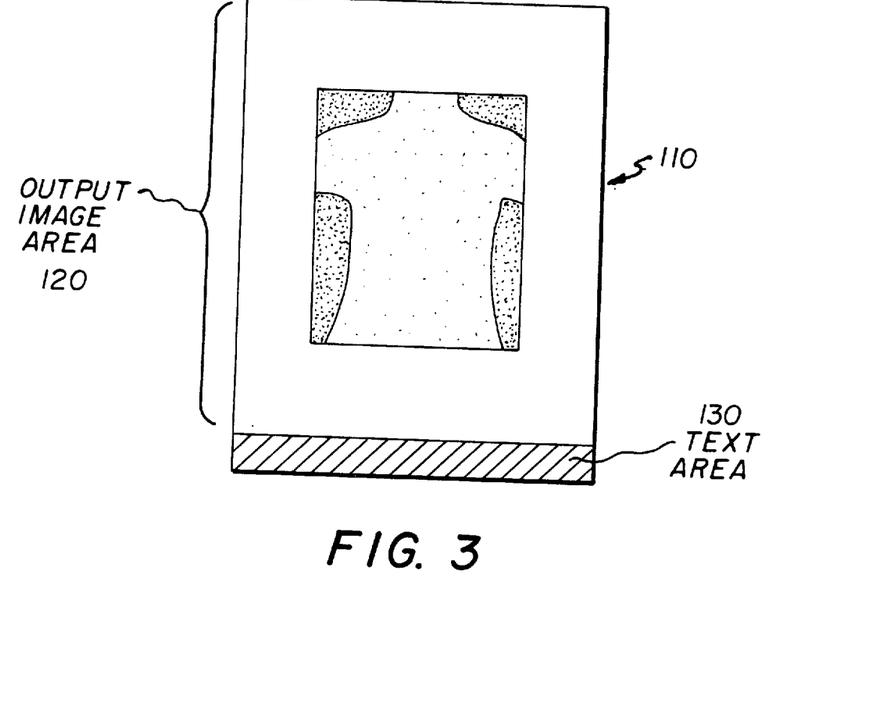
FIG. 3 is a schematic diagram illustrating one way in which orientation is useful for output image display.

In certain applications, a particular orientation in the output image is required. For example, in FIG. 3, a film 110 of a radiographic image is shown including an image area 120, where the input image signal or its processed data is stored, and a text area 130, where the a patient's information, such as name, date of exposure, imaging conditions, comments, etc., is stored. In this case, it is desirable for the film 110 to be adjusted in the direction "North" in accordance with the text representation format.

Figure 4:
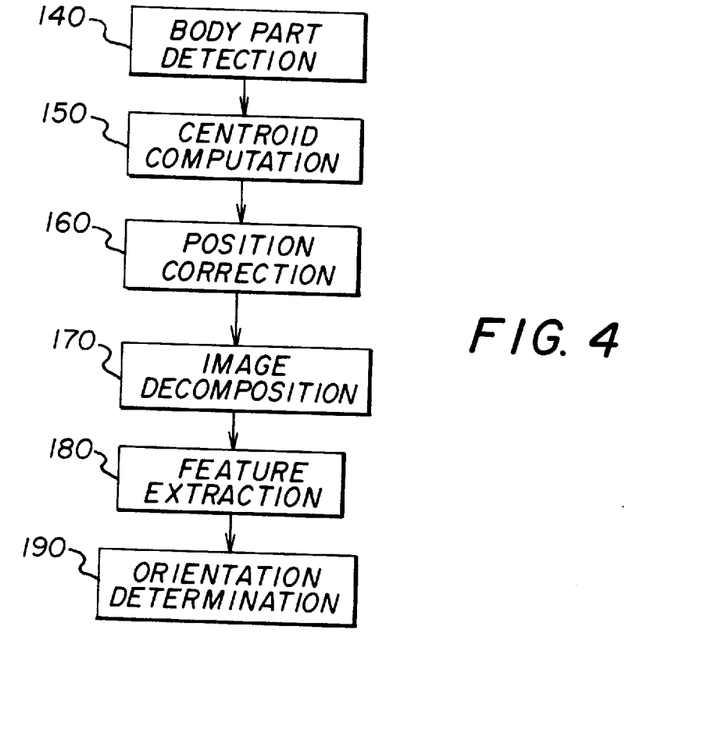
FIG. 4 is a block diagram illustrating the steps of the automated orientation determination method of the present invention.
Figure 5A:
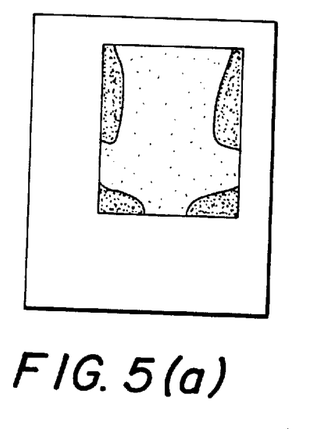
FIG. 5(a) is a schematic diagram illustrating a radiographic image with the neck portion of the body region of interest in the South direction.

In general, as shown in FIG. 4, the orientation determination method of the present invention includes the following steps: (1) body region detection 140; (2) body region center determination 150; (3) position correction 160; (4) image decomposition 170; (5) feature extraction 180; and (6) orientation determination 190. For purposes of illustration only, the operation of the present invention will be described with reference to a digital chest image, as shown in FIG. 5(a).

Spatial Segmentation

The first step, step 140, in the method of the present invention is to separate the regions of interest in an image signal, and, in particular, to locate and separate out the body region of the image signal. In order to distinguish the body region from the foreground/background of the image signal, the image is subjected to spatial segmentation, including the following analysis: edge detection; block generation; block classification; block refinement; and bit map generation.

As more specifically described in U.S. Pat. No. 5,268,967, which is incorporated by reference herein, in this step the edge content of the image is first analyzed. The local edge content is one indicator of the level of detail or "busyness" in various parts of the image, and, therefore, an indicator of whether these portions of the image are more likely to belong to the foreground, background or body region of the image. After the edge detection analysis is completed, the image is divided into a set of nonoverlapping, contiguous blocks of pixels. These blocks are separately analyzed and then classified into one of ten possible categories, depending on whether the block is basically homogeneous (relatively low edge density) or non-homogeneous (relatively high edge density) in nature, and based upon the content of the block (foreground pixels, background pixels, body region pixels, or various mixtures thereof).

The information regarding edge content, together with such information from neighboring blocks, is then used to classify each block of the image into one of two categories: foreground/background (i.e., undesired regions) or body region (i.e., desired region).

For blocks located around the periphery of the body region (i.e., mixtures of body region pixels with foreground and/or background pixels), further analysis is sometimes required. For such blocks, the fine structure inside each block is analyzed and classified into the above-mentioned two categories. This further analysis ensures that the edge pixels of the body region being imaged are not misclassified.

Finally, the classification scheme determined above is used to create a two-valued (binary) image that functions as a template for any further image analysis to be done on the image. For example, in FIG. 5(b), a binary segmented map, S, is generated wherein the body region pixels are represented by one code value (intensity), and the foreground/background pixels are represented by the other code value.

Figure 5B:
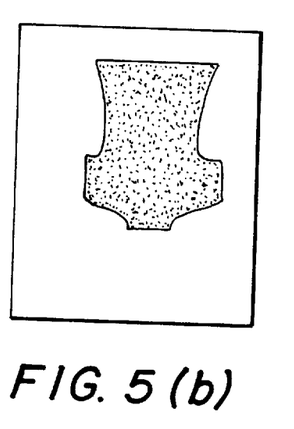
FIG. 5(b) illustrates the binary segmented map of the body region from the spatial segmentation step of the automated method of the present invention.
Figure 5C:
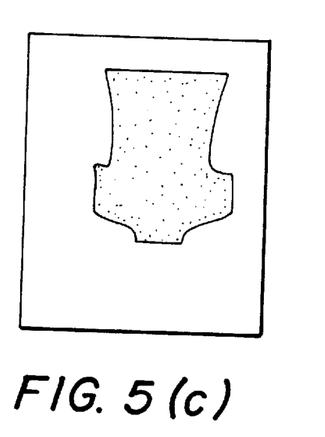
FIG. 5(c) illustrates the result of defining of the body region based upon spatial segmentation.

Consequently, the gray-level body part shown in FIG. 5(c) is determined by utilizing the binary segmented map, S, in FIG. 5(b) and is defined by:

$$h(x,y) = \begin{cases} f(x,y), & \text{if}(x,y) \in S \\ 0, & \text{if}(x,y) \notin S \end{cases} \quad (1)$$

The foregoing step can be further modified, if desired, depending upon the application. For example, if the peaks in an intensity histogram corresponding to foreground and background are separated far away from the peak(s) of the body region, histogram-based methods including simple selection of intensity thresholds may provide an efficient approach to detecting the body region.

Body Region Center Location

The second step, step 150, in the method of the present invention is to determine the center of the body region $h(x,y)$. The body region center is the exact center of the body region and, mathematically, the coordinates of the center of the body region, $x_c$ and $y_c$, are calculated by $$x_c = \frac{1}{N_s} \sum_{i=1}^{N_s} x_i, \quad y_c = \frac{1}{N_s} \sum_{i=1}^{N_s} y_i, \quad (2)$$

respectively; where $N_s$ is the total number of pixels in the binary segmented map S. The determination of this parameter of the image allows further steps of the method of the present invention to correct, if necessary, the placement of the image on the film.

Positional Correction

Figure 6A:
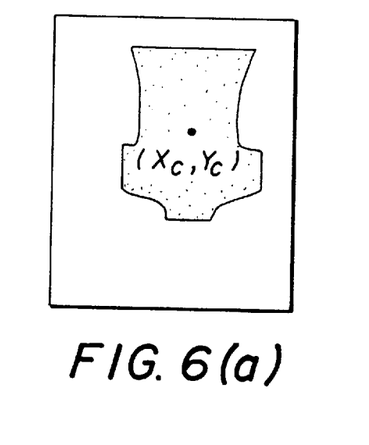
FIG. 6(a) illustrates the center ($x_c$, $y_c$) of the body region.
Figure 6B:
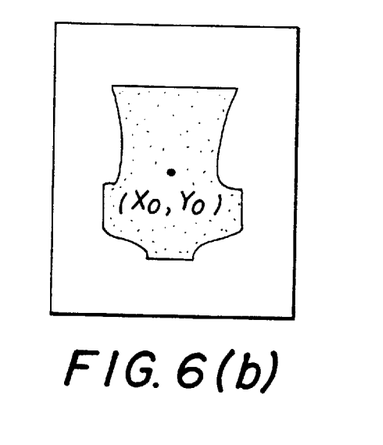
FIG. 6(b) illustrates the repositioning of the body region so that the center of the body region ($x_c$, $y_c$) coincides with the center of the image signal.

The third step, step 160, in the method of the present invention is to correct the position of the body region $h(x,y)$, if necessary. Due to factors inherent in image production processes, it is often the case that the true center of the body region, $(x_c, y_c)$, does not coincide with the center of the input image signal, $(x_o, y_o)$. As illustrated in FIGS. 6(a) and 6(b), the body region $h(x,y)$ can be shifted by the following amount:

$$(\Delta x, \Delta y) = (x_o - x_c, y_o - y_c) \quad (3)$$

such that the body part is located at the exact center of the image signal. Here, $(x_o, y_o)$ denoting the center of the input image signal is defined by $$x_o = \frac{1}{2} N_r, \quad y_o = \frac{1}{2} N_c, \quad (4)$$

where $N_r$ and $N_c$ represent the number of rows and columns in the input image signal, respectively. The resulting image from the position correction step is shown in FIG. 6 (b).

Image Decomposition

Figure 7A:
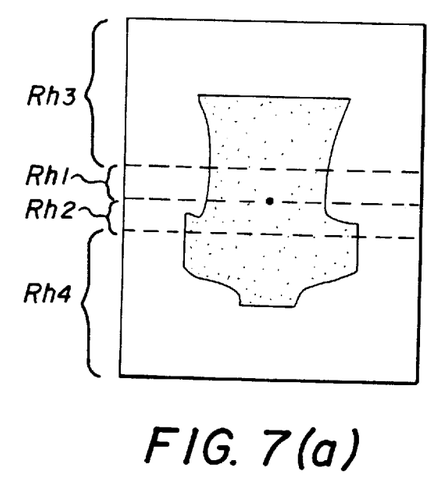
FIG. 7(a) illustrates the horizontal decomposition step of the automated method of the present invention.
Figure 7B:
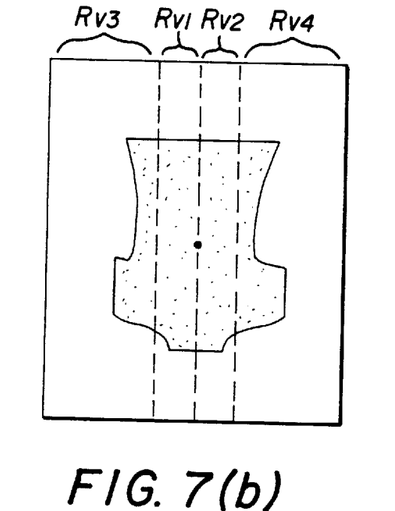
FIG. 7(b) illustrates the vertical image decomposition step of the automated method of the present invention.

In the next step of the preferred method of the present invention, the image signal is decomposed one or more horizontal and vertical strip regions. The strips are subjected to feature extraction analysis to prepare the image for further analysis and classification. Once the center of the body region is located at the center of the image signal, the body region of the image is decomposed into four nonoverlapping horizontal strip regions, $R_{hi}(1 \leq i \leq 4)$, and four nonoverlapping vertical strip regions, $R_{vi}(1 \leq i \leq 4)$, as shown in FIGS. 7(a) and 7(b). The width of the strip areas are determined according to the body part recorded and/or the relationship in size between the image signal and the body part. In the preferred embodiment of the present invention, the width of strip regions are determined as follows.

As previously described, the input image signal is assumed to have $N_r$ rows and $N_c$ columns, and its center is denoted by $(x_o, y_o)$. The horizontal strip regions $R_{h1}$ and $R_{h2}$ are designed to have the same width $W_h$. This, in turn, determines the four horizontal strip regions—$R_{h3}$, $R_{h1}$, $R_{h2}$, and $R_{h4}$—as ranging from the first row to the $(x_o-W_h)$th row, the $(x_o-W_h+1)$th row to the $(x_o)$th row, the $(x_o+1)$th row to the $(x_o+W_h)$th row, and the $(x_o+W_h+1)$th row to the $(N_r)$th row, respectively.

Similarly, the vertical strip regions $R_{v1}$ and $R_{v2}$ are designed to have the same width $w_v$. This, in turn, determines the four vertical strip regions—$R_{v3}$, $R_{v1}$, $R_{v2}$, $R_{v4}$—as ranging from, the first column to the $(y_o-w_v)$th column, the $(y_o-w_v+1)$th column to the $(y_o)$th column, the $(y_o+1)$th column to the $(y_o+w_v)$th column, and the $(y_o+w_v+1)$th column to the $(N_c)$th column, respectively. It has been determined that optimal values for $W_h$ and $w_v$ in the preferred embodiment of the present invention are $0.1 \times N_r$ and $0.1 \times N_c$, respectively. However, values for $w_h$ and $w_v$ ranging from $0.05 \times N_r$ to $0.20 \times N_r$ and $0.05 \times N_c$ to $0.20 \times N_c$, respectively, have been shown to work effectively in the preferred method of the orientation method of the present invention.

Feature Extraction

Once the image has been decomposed into strip regions, the next step, step 180, according to the orientation method of the present invention is to extract certain features from these strip regions. The features of interest to the present method are edge density, average intensity, standard deviation of intensity, and minimum average intensity.

To compute the edge density in various regions of the image signal, an edge detector is used. A variety of edge detection algorithms may be suitable for use as edge detectors in the present invention. In the preferred embodiment of this invention, a morphological edge detector is utilized due to its low sensitivity to noise, as well as its ability to yield an edge strength measure that is proportional to the contrast between two different regions. The specifics of the morphological edge detector used are found in U.S. Pat. No. 5,268,967, previously incorporated herein by reference.

The edge density in a given strip region is found by determining the ratio of the number of edge pixels in the body region that intersects with the given strip region, to the total number of pixels in the body region that intersects with the given strip region. Mathematically, the edge densities for the horizontal strip region $R_{hi}$ ($1 \leq i \leq 4$) and the vertical strip region $R_{vi}$ ($1 \leq i \leq 4$) can be expressed by $$\epsilon_{hi} = \frac{\text{Number of edge pixels in } (R_{hi} \cap \overline{S})}{\text{Number of Pixels in } (R_{hi} \cap \overline{S})} \quad (5)$$

$$\epsilon_{vi} = \frac{\text{Number of edge pixels in } (R_{vi} \cap \overline{S})}{\text{Number of Pixels in } (R_{vi} \cap \overline{S})} \quad (6)$$

respectively; where $\overline{S}$ is the position-corrected version of the segmented map S such that the center of $\overline{S}$ is located at $(x_o, y_o)$. Here edge density is used as one texture measure. Accordingly, the larger the edge density value, the more likely the region contains more levels of detail in the image signal.

The average intensity, $\mu_i$, and the standard deviation of intensity, $\sigma_i$, in each strip region are computed by $$\mu_{hi} = \frac{1}{\text{Area}[\overline{S} \cap R_{hi}]} \sum_{(i,j) \in \overline{S} \cap R_{hi}} h(i,j), \quad (7)$$

$$\mu_{vi} = \frac{1}{\text{Area}[\overline{S} \cap R_{vi}]} \sum_{(i,j) \in \overline{S} \cap R_{vi}} h(i,j), \quad (8)$$

$$\sigma_{hi} = \sqrt{\frac{1}{\text{Area}[\overline{S} \cap R_{hi}]} \sum_{(i,j) \in \overline{S}R_{hi}} (h(i,j))^2 - \mu_{hi}^2}, \quad (9)$$

$$\sigma_{vi} = \sqrt{\frac{1}{\text{Area}[\overline{S} \cap R_{vi}]} \sum_{(i,j) \in \overline{S}R_{vi}} (h(i,j))^2 - \mu_{vi}^2}, \quad (10)$$

Finally, the average intensity for each row in the central two horizontal strip regions $R_{h1} \cup R_{h2}$ is determined and then the minimum average intensity value, $\eta_{h,min.}$, is selected from all the rows determined. In a similar way, the average intensity is determined for each column in the central two vertical strip regions $R_{v1} \cup R_{v2}$ and then the minimum average intensity value, $\eta_{v,min.}$, is selected from all the columns determined. The values are confirmed mathematically, where $P_{hk}$ and $P_{vk}$ denote the kth row of the horizontal strip regions ($R_{h1} \cup R_{h2}$) and the kth column of the vertical strip regions ($R_{v1} \cup R_{v2}$), respectively, by $$\eta_{h,min} = \min_k \left\{ \frac{1}{\text{Area}[\overline{S} \cap P_{hk}]} \sum_{(i,j) \in \overline{S} \cap P_{hk}} h(i,j) \right\}, \quad (11)$$

and $$\eta_{v,min} = \min_k \left\{ \frac{1}{\text{Area}[\overline{S} \cap P_{vk}]} \sum_{(i,j) \in \overline{S} \cap P_{vk}} h(i,j) \right\}, \quad (12)$$

Although the extraction features illustrated herein include edge density, average intensity, standard deviation, and minimum average intensity, it should be noted that any type(s) and/or number of features can be utilized where those used provide differences according to the horizontal or vertical strip region. In other words, if the feature is extractable from the image signal in the horizontal and vertical strip regions and provides the ability to determine the orientation of the image, i.e., North, South, East, West, such feature(s) can be used, if desired.

Orientation Determination

In the final step of the preferred method of the orientation method of the present invention, the orientation of the image is determined by applying the following set of heuristic rules to the information determined in the previous steps of the invention. The following rules are applied:

Rule 1

If $\eta_{h,min.} \leq \eta_{v,min.}$, then the image is oriented in the horizontal (East or West) direction.

Figure 8:
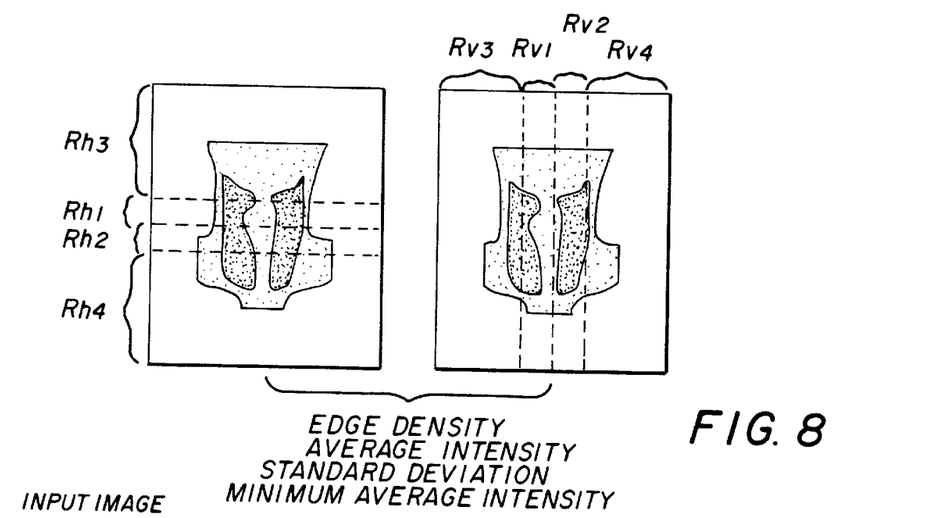
FIG. 8 illustrates the comparison of the feature extraction data from the horizontal and vertical decomposed areas.

This first rule is designed to determine whether an image is oriented in the horizontal (either East or West) direction. In this embodiment, the feature of minimum average intensity is used. As shown in FIG. 8, the mediastinal septum area located between the lungs and extending vertically near the central strip regions of the image contains a series of bones having lower radiation transmissivity than that of lung tissue. Since the image signal is made to have a signal level proportional to the amount of the radiation passing through the body part, the image signal level (intensity) of the mediastinal septum is lower than that of the lungs on the average. Accordingly, the minimum average intensity among the rows in the central horizontal strip regions $R_{h1} \cup R_{h2}$ is larger than that determined among the columns in the central vertical strip regions $R_{v1} \cup R_{v2}$. This conclusion is based upon the fact that in $R_{h1} \cup R_{h2}$, there exist some column(s) which contain a large portion of the mediastinal septum and a relatively small portion (or none) of lung tissue. Therefore, based upon the foregoing, the determination of horizontal position is reliable.

Rule 2: If $\eta_{h,min.} \leq \eta_{v,min.}$, then the image is oriented in the vertical (North or South) direction.

Using the same feature extraction information, i.e., the known location of bones versus tissue, etc., rule 2 is designed to determine whether an image is oriented in the vertical (either North or South) direction.

The following rules are designed to further classify the aforementioned horizontal direction into either the East or West direction, as well as the aforementioned vertical direction into either the North or South direction.

As illustrated in FIG. 8, the orientation of the image is determined to be in the vertical direction by Rule 2. To further classify its orientation, the features of edge density ($\epsilon$), average intensity ($\mu$), and standard deviation of intensity ($\sigma$) are used in this embodiment.

Since the body region in the horizontal strip region $R_{h4}$ contains the shoulders, neck, trachea, clavicles, and lung apex, it has a higher average intensity value along with more levels of detail than the area in the strip region $R_{h3}$, which includes primarily the diaphragm of the body region. Therefore, the orientation of the image is determined by comparing the features extracted from the strip regions $R_{h3}$ and $R_{h4}$.

Rule 3

If Rule 1 is true, and at least two of the following three conditions are true, (i) $\epsilon_{v3} \geq \epsilon_{v4}$, (ii) $\mu_{v3} \geq \mu_{v4}$, (iii) $\sigma_{v3} \geq \sigma_{v4}$, then the image is oriented in the West direction.

Rule 4

If Rule 1 is true, and Rule 3 is false, then the image is oriented in the East direction.

Rule 5

If Rule 2 is true, and at least two of the following three conditions are true(i) $\epsilon_{h3} \geq \epsilon_{h4}$, (ii) $\mu_{h3} \geq \mu_{h4}$, (iii) $\sigma_{h3} \geq \sigma_{h4}$, then the image is oriented in the North direction.

Rule 6

If Rule 2 is true, and Rule 5 is false, then the image is oriented in the South direction.

Figure 9:
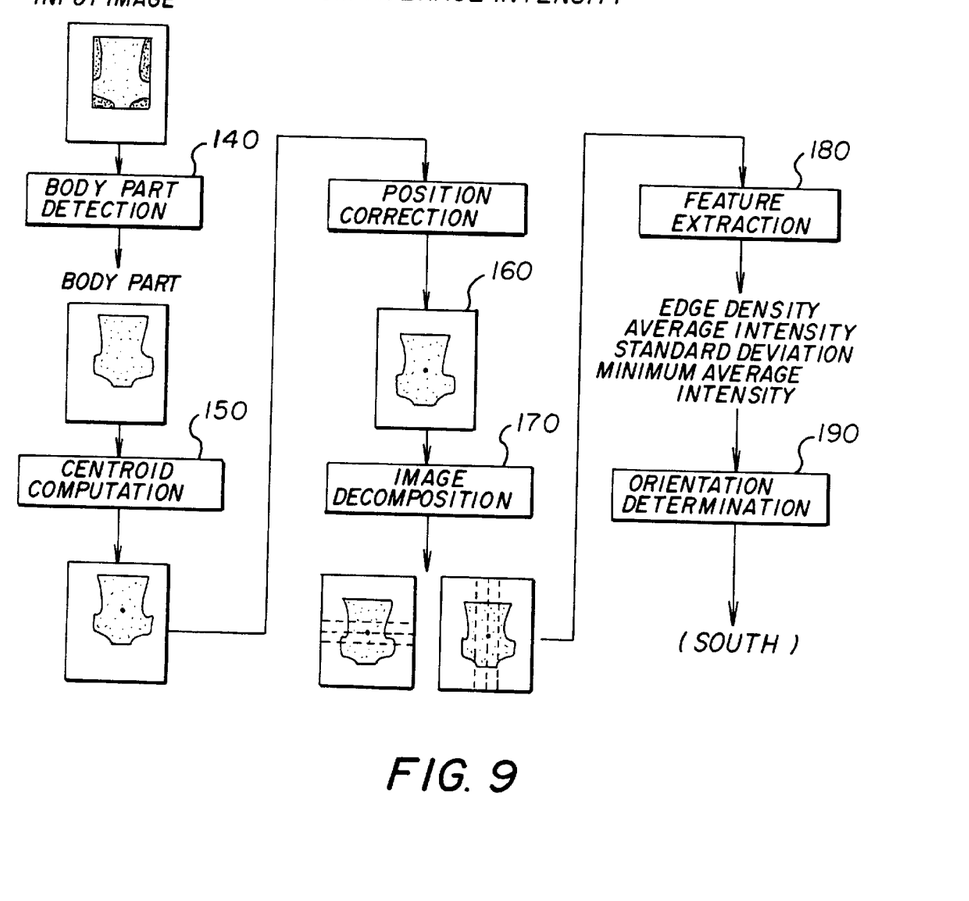
FIG. 9 is a schematic diagram illustrating the steps of the automated method of the present invention, and their intermediate results, as applied to the digital radiographic image of FIG. 5(a).

FIG. 9 illustrates all of the steps of the orientation method of the present invention. It should be noted that the present invention is not limited to the chest images, as illustrated, but may be adopted to other body regions where the orientation of the image can be determined based on the extracted features of the certain body region(s) within the image.

The method of the present invention has been tested on a large set of clinical data (more than 1000 images) obtained from a digital radiographic system; namely, KODAK EKTASCAN IMAGELINK Critical Care System (KEICCS), in which a storage phosphor reader is used as the image acquisition device. The original images were acquired at a resolution of 2048 pixels/line and 2500 lines and 12 bits/pixel. In order to make the orientation method of the present invention more efficient, the images were subsampled by a factor of 9 in both directions, resulting in an image 227 pixels by 277 pixels in size. The image size of the subsampled image chosen for the preferred embodiment of the present invention was based on a series of tests with image sizes ranging from full resolution (2048×2500) to 64×78. The quality of the results was not affected by image size until the smallest sizes were reached (subsampling factors greater than approximately 16).

Although a preferred embodiment of the invention has been illustrated in the accompanying drawings and described in the foregoing Detailed Description, it will be understood that the invention is not limited to the embodiment disclosed, but is capable of numerous rearrangements and modifications of parts and elements without departing from the spirit of the invention.

We claim:

1. An automated method for determining the positional orientation of radiographic images including a foreground, a background and an object of interest, comprising the steps of:

acquiring a digital image of the object of interest;

segmenting the image to separate the object of interest from the foreground and the background of the image;

determining a center of the digital image of the object of interest of the segmented digital image;

adjusting the position of the center of the digital image of the object of interest to coincide with the center of the segmented digital image;

decomposing the image into one or more strips;

extracting one or more features of the strips; and determining the orientation of the image; wherein the step of extracting one or more features of the strips further includes the steps of determining edge density, average density, intensity standard deviation and minimum average intensity of the image.

2. The method of claim 1, wherein the object of interest is an anatomical region.

3. The method of claim 1, wherein the step of decomposing the image into one or more strips includes selecting width of the strip size based upon information about the image.

4. The method of claim 1, wherein the step of determining the orientation of the image includes the use of one or more heuristic rules.

5. The method of claim 4, wherein the heuristic rule(s) used in the step of determining the orientation of the image compare features extracted from the image.

6. The method of claim 5, wherein the heuristic rules used in the step of determining the orientation of the image are based upon past orientation determinations.

7. A system for automated determination of the positional orientation of radiographic images including a foreground, a background and an object of interest, comprising:

means for acquiring image data from a radiographic image of the object of interest;

means for segmenting the image to separate the object of interest from the foreground and the background of the image;

means for determining a center of the digital image of the object of interest of the segmented digital image;

means for adjusting the position of the center of the digital image of the object of interest to coincide with the center of the segmented digital image;

means for decomposing the image into one or more strips;

means for extracting one or more features of the strips by determining edge density, average density, intensity standard deviation and minimum average intensity of the image; and means for determining the orientation of the image.

8. The system of claim 7, wherein the image is a subsampled image.

9. The system of claim 7, wherein the image is a non-subsampled image.

10. An automated method for determining the positional orientation of radiographic images including a foreground, a background and an object of interest, comprising the steps of:

acquiring a digital image of the object of interest;

segmenting the image to separate the object of interest from the foreground and the background of the image;

determining a center of the digital image of the object of interest of the segmented digital image;

adjusting the position of the center of the digital image of the object of interest to coincide with the center of the segmented digital image;

decomposing the image into one or more strips;

extracting one or more features of the strips; and determining the orientation of the image, including the use of one or more heuristic rules which compare features extracted from the image based upon past orientation determinations.

* * * * *

UNITED STATES PATENT AND TRADEMARK OFFICE
CERTIFICATE OF CORRECTION

PATENT NO. : 5,862,249
DATED : January 19, 1999
INVENTOR(S) : Ben K. Jang, et al It is certified that error appears in the above-identified patent and that said Letters Patent is hereby corrected as shown below:

Col. 8, Line 60  Please delete "$\leq$" and insert -->--.

Signed and Sealed this

First Day of June, 1999

Q. TODD DICKINSON

*Attest:*

*Attesting Officer*  *Acting Commissioner of Patents and Trademarks*